(12) United States Patent
Eliseev et al.

(10) Patent No.: US 10,828,599 B2
(45) Date of Patent: Nov. 10, 2020

(54) METHOD OF EXTRACTING COMPONENTS OF GAS MIXTURES BY PERTRACTION ON NANOPOROUS MEMBRANES

(71) Applicant: ROSNEFT OIL COMPANY (ROSNEFT), Moscow (RU)

(72) Inventors: Andrei Anatolievich Eliseev, Moscow (RU); Artem Anatolievich Eliseev, Moscow (RU); Dmitrii Igorevich Petukhov, Perm (RU); Andrei Aleksandrovich Poyarkov, Odintsovo (RU); Alexey Viktorovich Lukashin, Moscow (RU); Ekaterina Aleksandrovna Chernova, Kurgan (RU); Evgenii Sergeevich Piatkov, Moscow (RU)

(73) Assignee: ROSNEFT OIL COMPANY (ROSNEFT), Moscow (RU)

( * ) Notice: Subject to any disclaimer, the term of this patent is extended or adjusted under 35 U.S.C. 154(b) by 0 days.

(21) Appl. No.: 16/341,867

(22) PCT Filed: Oct. 3, 2017

(86) PCT No.: PCT/RU2017/050100
§ 371 (c)(1),
(2) Date: Apr. 12, 2019

(87) PCT Pub. No.: WO2018/070904
PCT Pub. Date: Apr. 19, 2018

(65) Prior Publication Data
US 2019/0240616 A1  Aug. 8, 2019

(30) Foreign Application Priority Data

Oct. 14, 2016 (RU) ................................ 2016140487

(51) Int. Cl.
*B01D 53/22* (2006.01)
*C10L 3/10* (2006.01)
(Continued)

(52) U.S. Cl.
CPC ....... *B01D 53/228* (2013.01); *B01D 53/1456* (2013.01); *B01D 53/18* (2013.01);
(Continued)

(58) Field of Classification Search
CPC ............ B01D 53/1456; B01D 53/1462; B01D 53/1468; B01D 53/1475; B01D 53/18;
(Continued)

(56) References Cited

U.S. PATENT DOCUMENTS 5,637,224 A    6/1997  Sirkar et al.
5,954,858 A *  9/1999  Peretti .................. B01D 53/229
                                                              95/44
(Continued)

FOREIGN PATENT DOCUMENTS

CN    103342623 A    10/2013
EA        17478 B1    12/2010
(Continued)

OTHER PUBLICATIONS

Written Opinion of the International Searching Authority issued in International Application No. PCT/RU2017/050100, dated Dec. 28, 2017 (Dec. 28, 2017) [English language translation of Box No. V at p. 4].
(Continued)

*Primary Examiner* — Jason M Greene
(74) *Attorney, Agent, or Firm* — Mintz Levin Cohn Ferris Glovsky and Popeo, P.C.

(57) ABSTRACT

The invention relates to the field of membrane gas separation. A method of removing components of gas mixtures which is based on passing the components of a gas mixture
(Continued)

through a nanoporous membrane and subsequently selectively absorbing them with a liquid absorbent that is in contact with the nanoporous membrane, wherein to prevent the gas from getting into the liquid phase of the absorbent and the liquid phase of the absorbent from getting into the gas phase, a nanoporous membrane with homogeneous porosity (size distribution less than 50%) and a pore diameter in the range of 5-500 nm is used, and the pressure differential between the gas phase and the liquid absorbent is kept below the membrane bubble point pressure. An acid gas removal performance of more than 0.3 nm$^3$/(m$^2$ hour) in terms of $CO_2$ is achieved at a hollow-fiber membrane packing density of up to 3200 m$^2$/m$^3$, which corresponds to a specific volumetric performance of acid gas removal of up to 1000 nm$^3$ (m$^3$ hour). The technical result is that of providing effective extraction of undesirable components from natural and process gas mixtures.

15 Claims, 4 Drawing Sheets

(51) Int. Cl.
    *B01D 61/36*     (2006.01)
    *B01D 53/14*     (2006.01)
    *B01D 53/18*     (2006.01)
    *B01D 53/52*     (2006.01)

(52) U.S. Cl.
    CPC ............ *B01D 61/362* (2013.01); *C10L 3/103* (2013.01); *C10L 3/104* (2013.01); *B01D 53/526* (2013.01); *B01D 2252/20478* (2013.01); *B01D 2257/304* (2013.01); *B01D 2257/306* (2013.01); *B01D 2257/504* (2013.01); *B01D 2325/02* (2013.01); *B01D 2325/20* (2013.01); *C10L 3/102* (2013.01)

(58) Field of Classification Search
    CPC .... B01D 53/22; B01D 53/228; B01D 53/229; B01D 61/362; B01D 2257/304; B01D 2257/504; B01D 2325/02; C01L 3/101; C01L 3/102; C01L 3/103; C01L 3/104; C10L 3/101; C10L 3/102; C10L 3/103; C10L 3/104
    See application file for complete search history.

(56) References Cited

U.S. PATENT DOCUMENTS

| | | | |
|---|---|---|---|
| 6,165,253 A * | 12/2000 | Sirkar | B01D 53/229 96/6 |
| 6,228,145 B1 | 5/2001 | Falk-Pedersen et al. | |
| 7,544,340 B2 | 6/2009 | Jamal et al. | |
| 7,591,878 B2 | 9/2009 | Feron et al. | |
| 8,702,844 B2 | 4/2014 | Heald et al. | |
| 2012/0247327 A1 * | 10/2012 | Omole | B01D 53/229 95/51 |
| 2016/0016111 A1 * | 1/2016 | Sirkar | B01D 53/229 423/228 |
| 2016/0206993 A1 * | 7/2016 | Deng | B01D 53/1462 |
| 2017/0320019 A1 * | 11/2017 | Doyen | B01D 63/081 |

FOREIGN PATENT DOCUMENTS

| | | |
|---|---|---|
| JP | S5358975 A | 5/1978 |
| JP | H10500612 A | 1/1998 |
| JP | H1099665 A | 4/1998 |
| JP | 2002363581 A | 12/2002 |
| JP | 2010520043 A | 6/2010 |
| KR | 10-2014-0035867 A | 3/2014 |
| RU | 2392038 C1 | 6/2010 |
| RU | 113670 U1 | 2/2012 |
| RU | 128515 U1 | 5/2013 |
| RU | 2592522 C2 | 7/2016 |
| RU | 2626645 C1 | 7/2017 |
| WO | WO-95/26225 A1 | 10/1995 |
| WO | WO-98/04339 A1 | 2/1998 |
| WO | WO-2008/102643 A1 | 8/2008 |
| WO | WO-2008/104793 A2 | 9/2008 |
| WO | WO-2011/038095 A1 | 3/2011 |
| WO | WO-2012/054455 A2 | 4/2012 |
| WO | WO-2012/177134 A1 | 12/2012 |
| WO | WO-2014/149433 A1 | 9/2014 |
| WO | WO-2018/070904 A1 | 4/2018 |

OTHER PUBLICATIONS

International Search Report issued in International Application No. PCT/RU/2017050100, dated Dec. 28, 2017 (Dec. 28, 2017) [English language translation].

International Search Report issued in International Application No. PCT/RU/2017050100, dated Dec. 28, 2017 (Dec. 28, 2017) [Russian language].

ASTM Standard F316-03 (Reapproved 2011), "Standard Test Methods for Pore Size Characteristics of Membrane Filters by Bubble Point and Mean Flow Pore Test," ASTM International, West Conshohocken, PA, 2011, 7 pages. https://doi.org/10.1016/0011-9164(89)80010-4, www.astm.org.

Shigidi, I.M.T.A. (2014, e-published Jul. 30, 2014). "The Use of Bubble Point Test in Membrane Characterisation." *American Journal of Science and Technology*, 1(4):140-144.

Smolders, K. and A.C.M. Franken (1989). "Terminology for Membrane Distillation," *Desalination* 72(3):249-262. Elsevier Science Publishers B.V., Amsterdam—Printed in the Netherlands. https://doi.org/10.1016/0011-9164(89)80010-4.

* cited by examiner

METHOD OF EXTRACTING COMPONENTS OF GAS MIXTURES BY PERTRACTION ON NANOPOROUS MEMBRANES

CROSS-REFERENCE TO RELATED APPLICATIONS

This application is a national stage entry, filed under 35 U.S.C. § 371, of International Application No. PCT/RU2017/050100, filed on Oct. 3, 2017, and claims the benefit of and priority to Russian Patent Application No. 2016140487, filed Oct. 14, 2016, the entire contents of each are incorporated herein by reference in their entireties and for all purposes.

FIELD OF INVENTION

The invention relates to the field of membrane gas separation and can be used for the removal of undesirable components of natural and process gas mixtures. The main purpose of the invention is the separation of acid gases ($CO_2$ and $H_2S$) from natural and associated petroleum gases for their conditioning for transport by pipeline. The invention relates to a method for removing components of a gas mixture, based on membrane pertraction and selective absorption of a gas-phase component into a liquid phase through a nanoporous membrane. Improved characteristics of the separation process and prevention of mutual permeation of gas into the liquid phase of an absorbent and the liquid absorbent into the gas phase are achieved by the use of nanoporous membranes having a pore diameter of 5 to 500 nm and a uniform pore size distribution, allowing the process to be performed at a transmembrane pressure maintained below the membrane bubble point pressure. The method provides a record $CO_2$ extraction rate of more than 0.3 $nm^3/(m^2 \cdot h)$ at a packing density of the hollow fiber membrane of up to 3200 $m^2/m^3$, which corresponds to a specific volumetric performance of acid gas removal of up to 1000 $nm^3/(m^3 \cdot h)$. This allows an efficient processing of natural and associated petroleum gases based on acidic components, using small-sized absorption modules, and a significant reduction in capital investment and operating costs of gas processing facilities.

BACKGROUND

The membrane pertraction technology is a process of penetrant transfer from gas phase to liquid phase through a membrane. The process is implemented in a membrane contactor [Falk-Pedersen, O.; Dannstrom, H. Method for Removing Carbon Dioxide from Gases, 2001]. A high contact surface area in a "gas-absorbent" system, created by hollow fibers, significantly reduces the dimensions of the membrane contactor and, as a consequence, the operating and capital costs of their construction.

There is a method for removing $CO_2$ from gases (U.S. Pat. No. 6,228,145B1 (WO98/04339)), using a hollow fiber membrane contactor. Acid gas is fed to hollow fibers, while the absorbent washes the outer surface. This design provides a reduction in the weight of the facility by 70-75%, a reduction in the size by 65%, and also a significant reduction in the loss of the absorbent compared to the traditional absorption column. The patent proposes the use of hollow fibers, both in an absorber and in a desorber for the absorbent regeneration. The hollow-fiber membrane packing density is 250-1000 $m^2/m^3$. The pore size of the membrane in the patent is proposed to be selected so as to exclude penetration of absorbent molecules (solvent) through the membrane, which limits the range of used materials to microporous membranes having extremely low $CO_2$ permeability (typically up to <<1 $m^3/(m^2 \cdot atm \cdot h)$). The patent does not provide for the use of transmembrane pressure, which inevitably leads to wetting a membrane with an amine solution, degradation of its internal structure and, during long-term operation, penetration of the liquid absorbent into gas phase. In addition, when the liquid absorbent penetrates the membrane pores, because in the liquid $CO_2$ diffusion coefficients are significantly lower than in the gas phase, the rate of gas transfer through the membrane significantly decreases, which negatively affects its performance.

U.S. Pat. No. 8,702,844 provides a method for improving the "absorbent-acidic component" contact and a membrane contactor based on it. The essence of the method consists in the modification of membrane material with nanoparticles different in chemical composition from the composition of the membrane material. The introduction nanoparticles of different chemical nature allows the surface wetting contact angle of the membrane material to be varied. It is proposed to use modified hollow fibers in both the absorber and regenerator. A disadvantage of the method is the need for an additional step of modification, which increases the cost of the membrane material, as well as the possibility of microdefects at the "nanoparticle-membrane material" boundary, which significantly reduces the chemical resistance of the membrane material.

A method of membrane gas separation using a membrane contactor based on polyacetylenes substituted with trimethylsilyl groups is also known from international patent U.S. Pat. No. 7,591,878. The invention is useful for desorption of carbon dioxide from absorbents at a high pressure. The process is performed under transmembrane overpressure (more than 1 bar) on the liquid phase side. A disadvantage of the invention is the use of polytrimethylsilylpropyne as polymeric material, which plasticizes under high pressure in the presence of carbon dioxide and loses its high permeability due to physical aging.

A similar method is implemented in a utility model of a high-pressure membrane contactor and an absorption-desorption device on its basis for separation and recovery of carbon dioxide from associated and flue gases (RU Patent No. 128515). The main disadvantage of this utility model is the use of a membrane based on polytrimethylsilpropine that undergoes rapid physical aging under exposure to $CO_2$, which is accompanied by physical degradation and a sharp decrease in the membrane permeability.

A similar method is also used in a device for mass transfer between liquid and gas phases (patent RU 2392038), the device comprising a mass transfer chamber formed by two porous polymer membranes non-wettable by liquid phase, between which a porous polymer material is placed, wherein the porous polymer material is non-wettable by liquid phase and comprises a system of open-ended channels through which the liquid phase is pumped. The outer surface of the membranes is washed by gas phase. The process is performed under overpressure on the liquid phase side, maintaining the transmembrane pressure lower than the capillary pressure of the porous materials. The device provides an increased efficiency of mass transfer processes in a liquid-gas system, but its industrial-scale implementation is too difficult. In addition, the overpressure on the liquid side leads to gradual wetting of porous materials and their degradation.

U.S. Pat. No. 7,544,340 provides a method for creating a more efficient contact of an acidic component with an absorbent in a hollow fiber membrane contactor. The method is implemented by supplying the absorbent under a pressure, which is higher so as to overcome a resistance to wetting of the microporous hollow fiber. As a result, the absorbent partially penetrates the pores of the hollow fiber. A disadvantage of this method is a possible degradation of the hollow fiber surface over time under an overpressure on the liquid phase side, which leads to a decrease in the rate of gas transfer through the membrane when the pores are filled with the liquid phase and to the ingress of the liquid absorbent into gas phase during long-term operation. This technical solution was chosen as a prototype for the claimed method of extracting components of gas mixtures.

Thus, the main problem of the extraction of components of gas mixtures by pertraction using "gas-liquid" membrane contactors is the gradual wetting of the membrane with an absorbent solution under overpressure on the liquid phase side, which leads to the degradation of the membrane material, a reduction in the transfer rate of components when the pores are filled with the liquid phase and, during long-term operation, penetration of the liquid absorbent into the gas phase.

To prevent pores from filling with liquid phase, the most promising solution is the maintenance of overpressure in gas phase, but, in the absence of the affinity of a liquid absorbent for membrane material, this inevitably leads to the formation of gas bubbles and diffusion of the gas into the liquid phase. To prevent this phenomenon, the outer surface of membrane material must have chemical affinity for the absorbent, and the pressure between the gas and liquid phases should not exceed the bubble point of the membrane, which determines the minimum gas pressure under which the liquid is pressed out of membrane pores with a maximum diameter. Thus, the bubble point determines the maximum pressure drop between gas and liquid, at which the membrane gas separation is possible, while avoiding penetration of gas into liquid and vice versa.

Since the bubble point of a membrane is determined, according to the Laplace equation, by the largest pores, the maximum allowable pressure for the pertraction process will be limited by the membrane pore diameter. For significant transmembrane pressures (0.1-10 bar), the membrane pore diameter should be in the nanometer range (5-500 nm). In addition, a sufficiently low dispersion in the pore size distribution (less than 50%) is an essential parameter that ensures the homogeneity of membrane properties and the displacement of liquid from all pores. In a wide distribution of pore sizes, small pores can be filled with a liquid absorbent phase due to capillary pressure, which will reduce the performance of the membrane and lead to its degradation.

SUMMARY OF THE INVENTION

The present method is aimed at solving the problem of extracting undesirable components from natural and process gas mixtures, including natural and associated petroleum gas, by pertraction in a membrane contactor with an increased efficiency.

The proposed method is based on the passage of components of a gas mixture through a nanoporous membrane and selective absorption of the components with an absorbent contacting the nanoporous membrane, wherein a pressure difference between the gas phase and the liquid absorbent is maintained below the membrane bubble point pressure. The proposed method prevents penetration of the liquid phase into the membrane pore volume, which significantly increases its performance and prevents the material from degradation. This allows for an efficient processing and purification of natural and process gases to meet the technical requirements, including on acidic components, using a small-size absorption modules, and a significant reduce in capital investment and operating costs of gas processing facilities, and an increase in the resistance of the membrane contactor to operational failures.

This technical result for the method of extracting components from natural and process gas mixtures is achieved by using a nanoporous membrane with a pore diameter in the range of 5-500 nm and a low dispersion of the pore size distribution (less than 50%), and by maintaining a transmembrane pressure between a gas phase and a liquid absorbent in the membrane contactor below the membrane bubble point pressure.

A nanoporous membrane can be made in a flat-frame and tubular geometry, as well as in the form of hollow fibers. Structurally, the membrane can be made in the form of an asymmetric membrane with a nanoporous selective layer on a large pore substrate. The membrane can be made on the basis of both inorganic and organic materials resistant to the action of an absorbent, and its outer surface can be chemically modified to provide a higher affinity for a solvent [N. Hilal, M. Khayet, C. J. Wright Membrane modification: technology and application, 2012]. The membrane material can be anodic alumina, tracking polymers (polycarbonate, polyethylene terephthalate), as well as polyvinylidene difluoride (PVDF), polysulfone, polyethersulfone, polypropylene. The listed materials are characterized by a size pore distribution that does not exceed 50%, a pore size in the range of 5-250 nm, and a bubble point value of up to 2 bars.

Aqueous solutions of primary, secondary and tertiary amines, as well as mixtures of amines of different basicity, glycol solutions, physical absorbents used for processing natural and process gases by absorption can be used as the absorbent [A. L. Kohl and R. Nielsen, Gas Purification, 1997].

This method provides extraction of components, such as $CO_2$, $H_2S$, mercaptans, and water from natural and process gas mixtures, including natural and associated petroleum gas. The extraction extent of components reaches the level of 90-99%.

The absorbent regeneration is also possible through a nanoporous membrane by maintaining a pressure difference between the gas phase and the liquid absorbent below the membrane bubble point pressure and by using stripping gas that does not contain adsorbed components. The use of the claimed method also reduces the action of the liquid absorbent on the membrane material, significantly improves the resistance of the membrane contactor to operational impacts, increases the gas transfer efficiency, and in general reduces the capital investment and operating costs for gas processing facilities.

These features are essential and are associated with the formation of a stable combination sufficient to obtain a desired technical result.

The method significantly increases the extraction rate of acid gases (more than 0.3 $nm^3/(m^2 \cdot h)$ for $CO_2$) at a hollow fiber membrane packing density of up to 3,200 $m^2/m^3$, which corresponds to a specific volumetric performance of acid gas removal of up to 1000 $nm^3/(m^3 \cdot h)$. This method provides an effective processing of natural and associated petroleum gases in regard to acidic components, on absorption modules and regeneration modules of a small size. The present invention is industrially applicable and can be carried out in an industrial scale.

The principle of extraction of components of natural and process gas mixtures by petraction on nanoporous membranes is shown in FIG. 1.

EMBODIMENTS OF THE INVENTION

The present invention is illustrated in relationship to specific embodiments, which are not intended to limit the scope of the invention.

Examples 1 to 6. Extraction of $CO_2$ and $H_2S$ from Mixtures Simulating the Composition of Natural Gas The process of extracting acidic components is carried out as follows. A feed gas is fed to the acid gas absorber of a pertraction module. The contact between an absorbent and the gas occurs at a temperature of ~30° C., and the regeneration of an absorbent solution occurs at 80-130° C. For regeneration, the absorbent solution is cyclically fed to a regenerator where desorption of absorbed $CO_2$ and $H_2S$ occurs.

The pertraction process is intensified by using a module designed for countercurrent mass exchange. The membrane pertraction module includes an absorber body with a cartridge of hollow polymer fibers and a regenerator. The module provides for the installation and preservation of hollow fiber membrane elements that provide a possible contact between liquid and gaseous media under a process pressure of up to 10 atm, a gas flow rate of up to 10 $nm^3/h$, and a liquid flow rate of up to 0.1 $nm^3/h$. The hollow fiber membrane module with a diameter of up to 150 mm is configured to be installed and replaced. The absorber body has a tubular shape with a length of 900 mm, an inner diameter of 160 mm, and a wall thickness of 3 mm. The housing of the regenerator completely repeats a similar element of the absorber. The system for supplying gas and liquid phases is configured to maintain a constant transmembrane pressure between the gas phase and a liquid absorbent by using an automatic pressure maintaining system and by means of a liquid absorbent column pressure.

Figure 1:
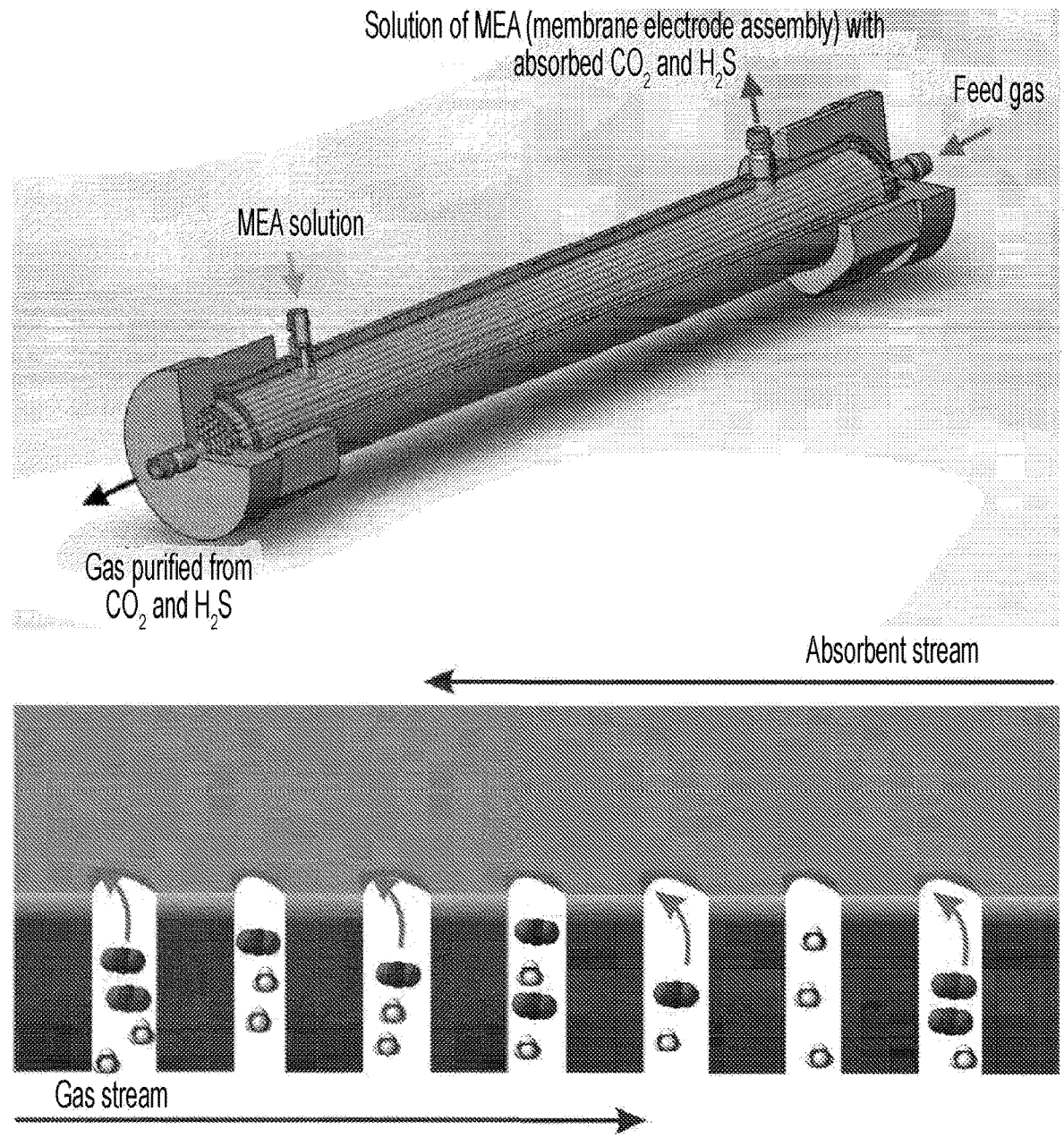
FIG. 1 shows the principle of extraction of components of natural and process gas mixtures by petraction on nanoporous membranes.
Figure 2:
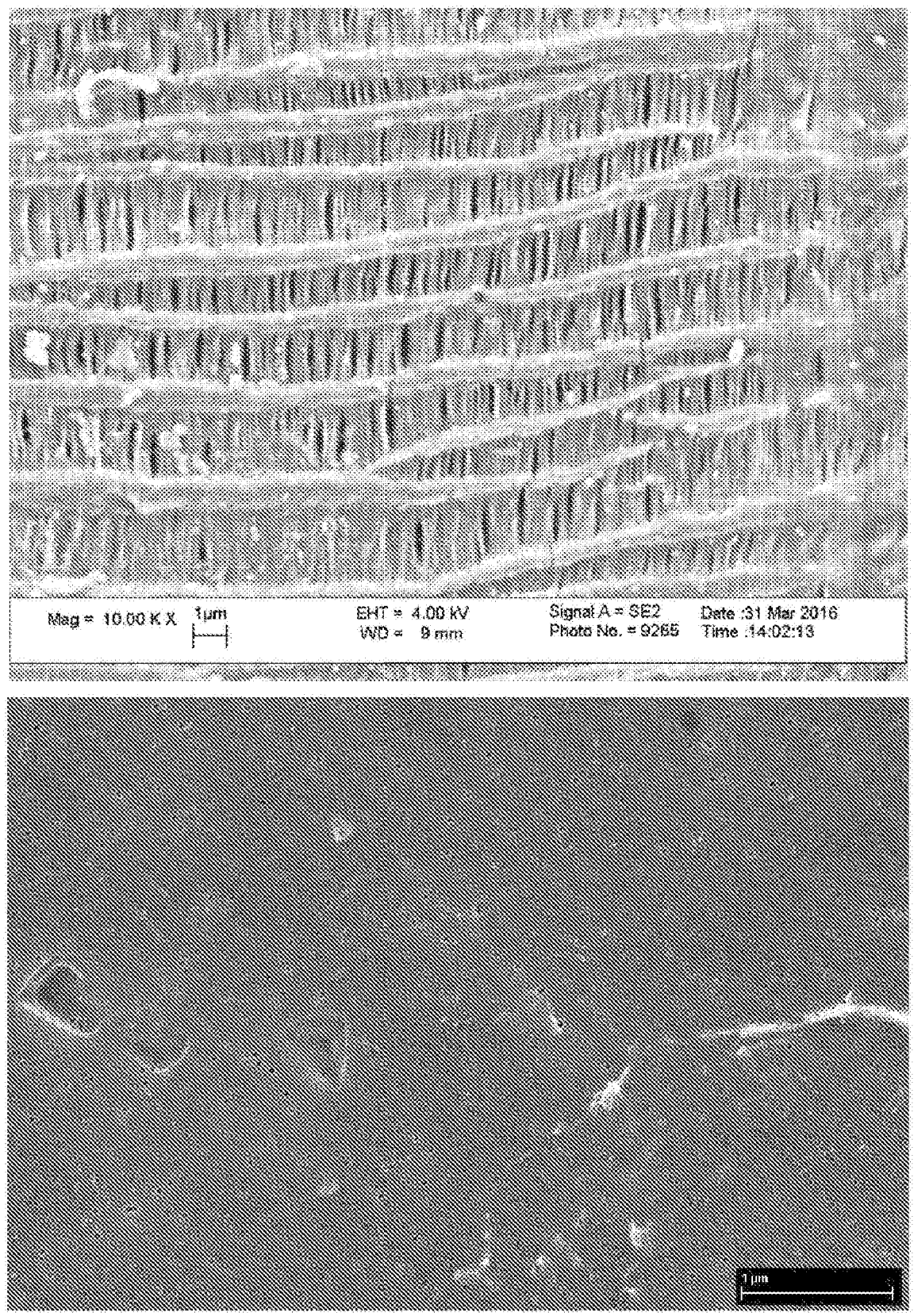
FIG. 2 shows typical micrographs of the microstructure of the nanoporous membrane surface used to carry out the method.

An aqueous solution of monoethanolamine (25%) is used as the absorbent for carrying out the method. Hollow fibers based on polyvinylidene difluoride (PVDF), polyethersulfone, polysulfone and polypropylene are used as the nanoporous membrane. The main characteristics of the membranes are given in Table 1, and typical micrographs of the used membranes are shown in FIG. 2.

Figure 3:
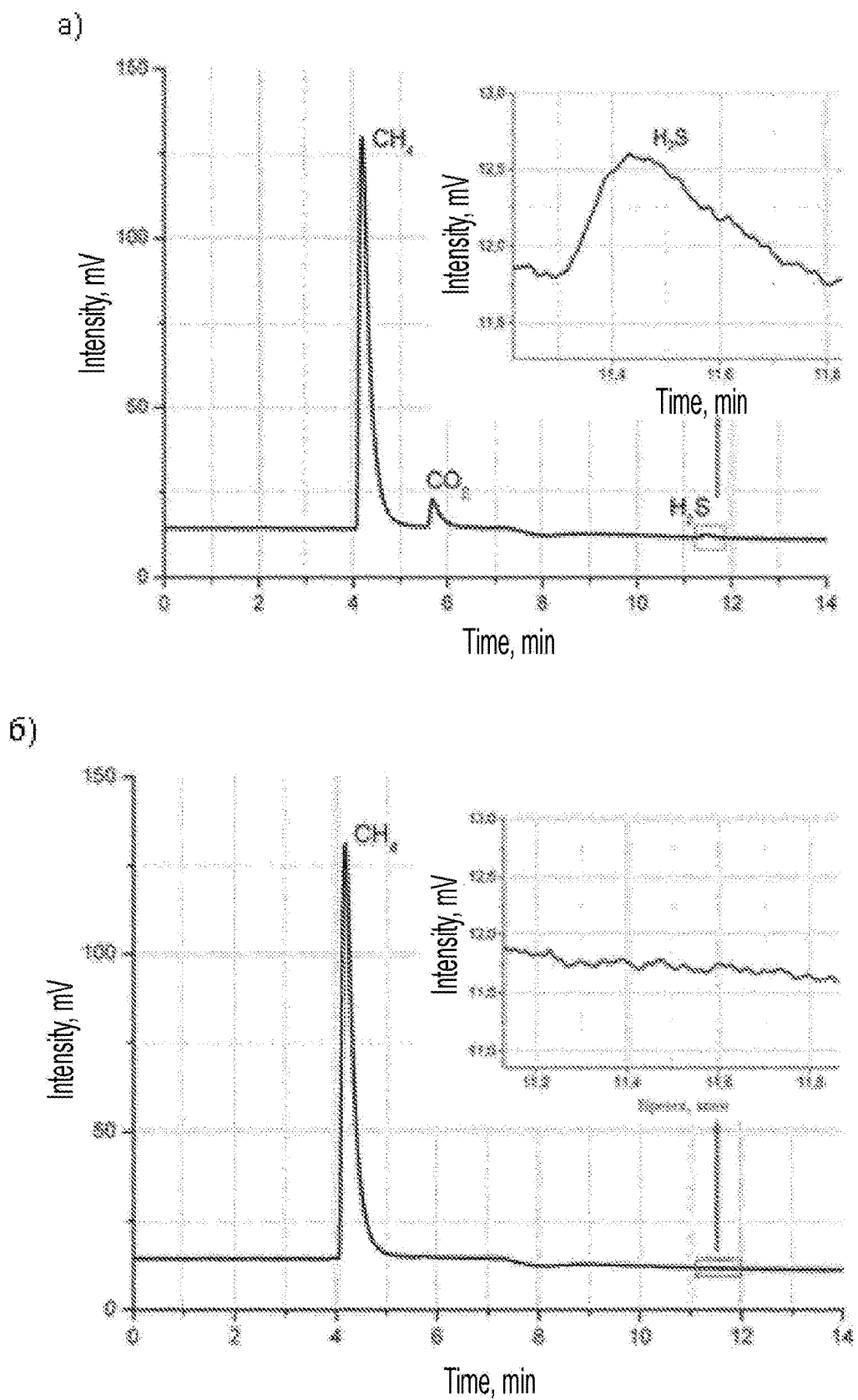
FIG. 3 shows typical chromatograms of a test raw mixture consisting of 94.5% $CH_4$, 5% $CO_2$, and 0.5% $H_2S$ and a processed gas, which are prepared using the claimed method (specific flow rate of feed gas is 1 $nm^3/m^2/h$).

The method was tested using a gas mixture consisting of 94.5% $CH_4$, 5% $CO_2$, and 0.5% $H_2S$, and the flow rate of the feed mixture was ranged from 0.5 to 10 $nm^3$/hour. The content of acid gases in the mixture was determined by chromatography. FIG. 3. shows chromatograms of the test feed mixture consisting of 94.5% $CH_4$, 5% $CO_2$, and 0.5% $H_2S$ and a retentate at a specific flow rate of the feed mixture of 1 $nm^3/m^2/h$.

Figure 4:
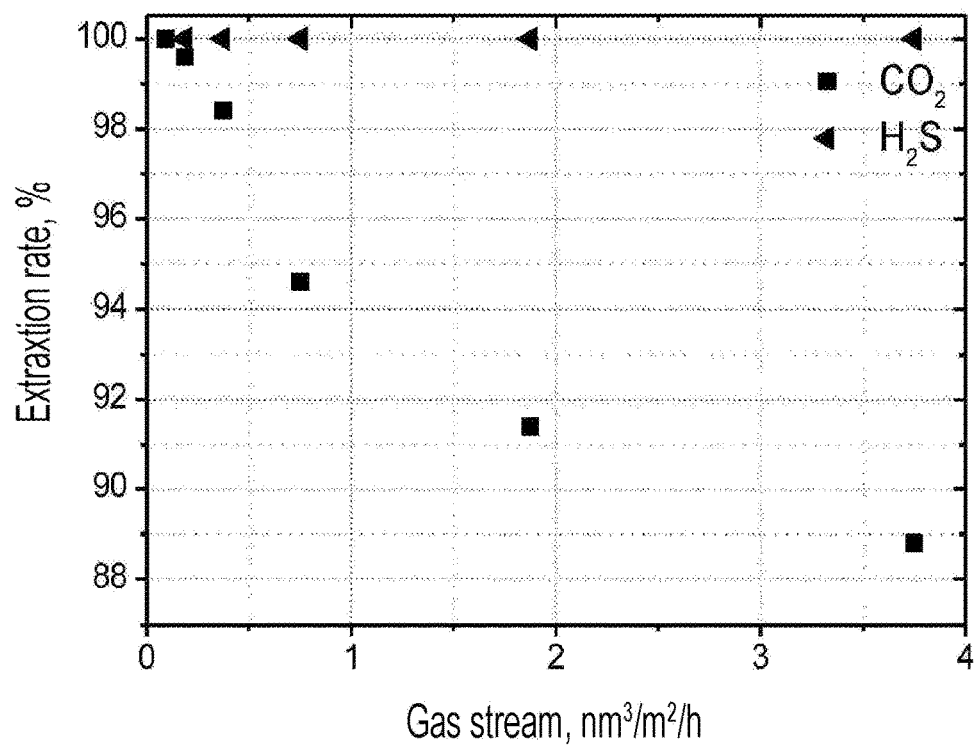
FIG. 4 shows dependence of the extraction extent of acidic components on the feed mixture flow rate, obtained by the claimed method.

It can be seen that the implementation of the method leads to almost complete removal of both $CO_2$ and $H_2S$ (the detection limit of hydrogen sulfide by this method is 0.005 vol. % of $H_2S$). FIG. 4 shows dependence of the extraction extent of acidic components on the flow rate of the feed mixture. Throughout the entire range of the flow, hydrogen sulfide is completely removed from the mixture, while the extraction extent for carbon dioxide decreases with increasing the flow rate of the feed stream.

At the same time, a 90% extraction extent for $CO_2$ provides processing a gas mixture with a content of carbon dioxide of up to 20% to the extent, which meets the requirements of the STO Gazprom 089-2010. Thus, the membrane pertraction module can be used for pre-conditioning of associated petroleum gas in regard to acidic components, with a specific acid gas extraction rate for $CO_2$ over 0.3 $nm^3/(m^2 \cdot h)$. At a hollow fiber membrane packing density of up to 3200 $m^2/m^3$, this corresponds to a specific volumetric performance of acid gas removal of up to 1000 $nm^3/(m^3 \cdot hour)$.

Figure 5:
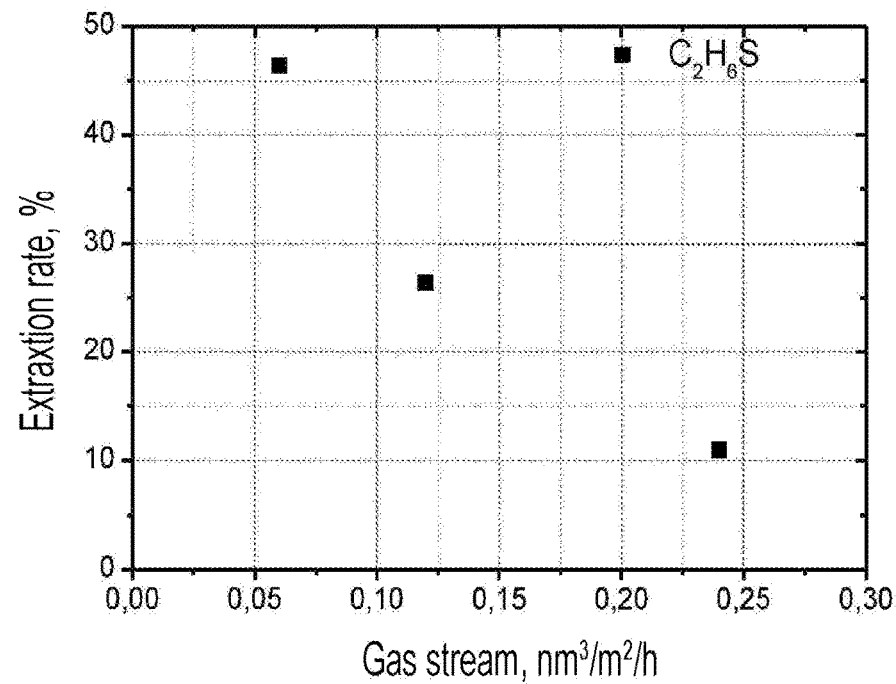
FIG. 5 shows dependence of the extraction extent of $C_2H_6S$ on the feed mixture flow rate, obtained by the claimed method.

The method for removing mercaptans was tested using a gas mixture consisting of 1.3% $N_2$, 67.2% $CH_4$, 4.5% $CO_2$, 7.8% $C_2H_6$, 5.1% $C_3H_8$, 4.6% i-$C_4H_{10}$, 7.8% n-$C_4H_{10}$, 1.0% i-$C_5H_{12}$, 0.6% n-$C_5H_{12}$, and 0.1% $C_6H_{14}$, with a content of $C_2H_6S$ of 54 $mg/m^3$. The flow rate of the feed mixture ranged from 0.05 to 0.25 $nm^3/h$. The content of mercaptans was determined by chromatography-mass spectrometry. Dependence of the extraction extent of mercaptans on the flow rate of the feed mixture is shown in FIG. 5. It can be seen that the proposed method provides a reduced concentration of mercaptans in the gas mixture; however, their extraction extent is less (10-45%) than the extraction extents for hydrogen sulfide and carbon dioxide.

Thus, according to the obtained data, the claimed method allows effective extraction of undesirable components of natural and process gas mixtures and a significant reduction in the size of the absorption modules, which significantly reduces the capital investment and operating costs of gas processing facilities.

TABLE 1

The main characteristics of the membranes used as examples in the method for extracting components from natural and process gas mixtures by pertraction on nanoporous membranes

| Example | 1 | 2 | 3 | 4 | 5 | 6 |
| --- | --- | --- | --- | --- | --- | --- |
| Membrane material | PVDF | PVDF | polyethersulfone | polyethersulfone | polysulfone | polypropylene |
| Surface type | Hydrophilic | Hydrophobic | Hydrophilic | Hydrophobic | Hydrophilic | Hydrophobic |

TABLE 1-continued

The main characteristics of the membranes used as examples in the method for extracting
components from natural and process gas mixtures by pertraction on nanoporous membranes

| Example | 1 | 2 | 3 | 4 | 5 | 6 |
|---|---|---|---|---|---|---|
| Average pore size, nm | 10 | 10 | 10 | 10 | 10-30 | 100 × 500 |
| Bubble point, bar | 0.5 | 0.2 | >2 | 0.2 | 0.3 | 0.2 |
| Permeability for $CO_2$, $m^3/(m^2 \cdot atm \cdot h)$ | 0.42 | 0.62 | — | 0.61 | 10 | 40 |
| $CO_2$ selection rate, $nm^3/(m^2 \cdot h)$ | 0.03 | 0.02 | 0.035 | 0.0068 | 0.08 | 0.36 |
| Membrane packing density, $m^2/m^3$ | 1000 | 1000 | 1000 | 1000 | 1000 | 3200 |
| Specific volumetric performance, $nm^3/(m^3 \cdot h)$ | 30 | 20 | 35 | 6.8 | 80 | >1000 |

The invention claimed is:

1. A method of extracting components of natural, process, or associated petroleum gas mixtures by pertraction, the method comprising:
   passing a feed mixture in a gas phase on one side of a nanoporous membrane and an absorbent on the opposite side of the membrane, wherein the membrane includes pores with an average pore diameter in a range between 5 nm and 500 nm and a dispersion of a pore size distribution that does not exceed 50%, and
   providing the diffusion of the gas components through the pores of the nanoporous membrane and their absorption with a liquid absorbent stream while generating a pressure difference between the gas phase and the liquid absorbent, which is below the nanoporous membrane bubble point pressure to prevent penetration of the gas into the absorbent liquid phase and the absorbent liquid phase into the gas phase;
   wherein the final extraction rate of the extracted components is greater than or equal to 0.3 $nm^3/m^2h$ and the specific volumetric performance of pertraction is 1000 $nm^3/m^3h$.

2. The method according to claim 1, wherein the pressure difference between the gas phase and the liquid absorbent is maintained constant by using an automatic pressure maintaining system and by means of a liquid absorbent column pressure.

3. The method according to claim 2, wherein the nanoporous membrane bubble point pressure is up to 10 bar.

4. The method according to claim 1, wherein the nanoporous membrane is made in a flat-frame or tubular geometry, or in the form of hollow fibers.

5. The method according to claim 4, wherein the outer surface of the nanoporous membrane is chemically modified to provide a higher affinity for a solvent.

6. The method according to claim 4, wherein the nanoporous membrane is made in the form of an asymmetric membrane containing a selective nanoporous layer on a large pore substrate.

7. The method according to claim 1, wherein an increase in the extraction extent of absorption is achieved by using a nanoporous membrane characterized by a packing density of up to 3200 $m^2/m^3$.

8. The method according to claim 1, wherein a constant gas/liquid phase contact area is provided.

9. The method according to claim 7, wherein the extracted components are acid gases; and natural, process, or associated petroleum gases are used as the feed mixture.

10. The method according to claim 8, wherein solutions of amines are used as the liquid absorbent.

11. The method according to claim 9, wherein materials resistant to the action of amine solution are used as the material of the nanoporous membrane.

12. The method according to claim 1, wherein a regeneration of the absorbent, which has passed through the nanoporous membrane, is further performed by passing the absorbent through a separate nanoporous membrane by providing a pressure difference between the gas phase and the liquid absorbent below the nanoporous membrane bubble point pressure and by using a stripping gas not containing absorbed components, wherein the purified absorbent is reused for extraction of components of natural and process gas mixtures, thus providing a closed process cycle.

13. The method according to claim 9, wherein the acid gases are selected from a group consisting of $CO_2$, $H_2S$, $SO_2$, $CH_3SH$, $C_2H_5SH$ and $(CH_3)_2S$.

14. The method according to claim 10, wherein the amines are selected from a group consisting of monoethanolamine, diethanolamine, and methyldiethanolamine.

15. The method according to claim 11, wherein the materials resistant to the action of amine solutions are selected from the group consisting of polytetrafluoroethylene, polypropylene, polysulfone, polyethersulfone, polyether ether ketone, polyvinylidene fluoride, and alumina.

* * * * *